US005433805A

United States Patent [19]

Schmidmeier

[11] Patent Number: 5,433,805

[45] Date of Patent: Jul. 18, 1995

[54] METHOD FOR CRACK PREVENTION IN BAMBOO CANES

[76] Inventor: Alexander Schmidmeier, Il. Kelud 69, Tewang Wates, Kidiri, 64147 Jatim, Indonesia

[21] Appl. No.: 180,584

[22] Filed: Jan. 11, 1994

[30] Foreign Application Priority Data

Jan. 12, 1993 [DE] Germany ........................ 43 00 557.8

[51] Int. Cl.⁶ .............................................. B32B 31/12

[52] U.S. Cl. ...................................... 156/84; 156/256; 156/259; 156/293; 144/330; 144/333; 144/345; 144/346; 144/353; 144/364; 428/17; 428/18; 428/35.6

[58] Field of Search ................... 156/57, 84, 211, 256, 156/259, 293; 144/333, 345, 346, 330, 353, 364, 380; 428/15, 17, 18, 35.6

[56] References Cited

U.S. PATENT DOCUMENTS

| | | | |
|---|---|---|---|
| 1,552,954 | 9/1925 | Rockwell | 156/256 |
| 1,688,569 | 10/1928 | Wensel | 144/333 |
| 3,897,581 | 7/1975 | Nakatsuka et al. | 156/79 |
| 4,184,404 | 1/1980 | Tomioka | 84/293 |
| 4,938,820 | 7/1990 | McMills | 156/293 |
| 5,293,700 | 3/1994 | Ishii | 34/225 |

FOREIGN PATENT DOCUMENTS

| | | | |
|---|---|---|---|
| 3131820 | 2/1983 | Germany | 144/346 |
| 3-221405 | 9/1991 | Japan | 144/330 |
| 3-239501 | 10/1991 | Japan | 144/333 |

*Primary Examiner*—Michael W. Ball
*Assistant Examiner*—Michele K. Yoder
*Attorney, Agent, or Firm*—Dykema Gossett

[57] ABSTRACT

A method for preventing cracks in bamboo canes subjected to drying comprises longitudinally cutting open the bamboo cane along its entire length, allowing the cut cane to dry to a desired residual moisture content, and sealing the resulting longitudinal gap by adhesively bonding into the longitudinal gap a multi-section filler strip. The longitudinal gap may be milled out to produce desired dimensioning and shaping. The strip may also be mechanically attached to the cane by clips, screws or dowels. The cane may be optionally chemically pretreated before drying.

17 Claims, 2 Drawing Sheets

METHOD FOR CRACK PREVENTION IN BAMBOO CANES

BACKGROUND OF THE INVENTION

The invention relates to a method for treating bamboo canes to prevent them from cracking.

Because of its high elasticity and stability, bamboo is used as a constructional element in a variety of ways, predominantly in Asia, from the erection of scaffolding of church-tower height through its use as a material for seating furniture and crockery.

In Europe, bamboo is also used predominantly for producing seating furniture, bed frames and the like.

The fundamental problem with bamboo for these applications is that the moisture content possessed by the bamboo cane during its growth, namely approximately 55–110% by weight, is reduced to that of the air humidity of the surroundings discontinuation of the capillary water supply from the roots. Although in Asia, because the air humidity is usually very high, this difference only leads to cracking of the bamboo cane in isolated cases, when transported to Europe or North America, and especially when used in centrally heated or air conditioned rooms, such canes crack almost regularly because of the very high humidity difference.

Although cracking also adversely affects the stability of the bamboo cane, it is not this that is the decisive disadvantage but rather the impaired optical effect when the bamboo cane has been used as a construction material for relatively high-quality furniture.

Since the bamboo cane has a closed, round cross-section and is subdivided in the longitudinal direction at irregular intervals by transverse walls in the manner of bulkheads, the methods for crack prevention known from the treatment of solid wood processed to form boards (laminated gluing of the solid wood planes with grain directions at angles to one another) cannot be used for crack prevention, since, on the one hand, seen from a purely biological point of view, bamboo is not a type of wood but a giant grass and, even apart from this, there are almost contradictory characteristics from a physical point of view.

Wood has conductive cells for liquid transport predominantly in the outer regions directly under the bark, and a tree trunk therefore has the highest moisture content in its outer region and the lowest moisture content in its core region, the situation is exactly the opposite in the case of bamboo.

In the outer third of the cane there are located the supporting cells which provide the bamboo with its strength, whereas the conducting cells and storage cells for the water to be absorbed together with the nutrients contained therein follow towards the inside. As a consequence, the two substances behave completely differently; in addition, because of its hollow structure with the transverse walls present in the axial direction, the physical behavior of bamboo is also completely different.

Further, the moisture content of bamboo canes, when cut, is not only fundamentally higher than in the case of wood but it also fluctuates much more greatly in dependence on the location, current climate and, considered in the cross-sectional direction of the bamboo cane as well as in the axial longitudinal direction, on the size.

One object of the present invention is therefore to provide a method with which bamboo canes, having two and more transverse walls, can be treated in such a manner that cracking of the bamboo cane after its processing is prevented.

According to the method of the present invention, the mechanical stresses are reduced which normally cause the cracking. These stresses are caused on the one hand by the closed, round cross-sectional contour of the bamboo as a result of which tensile stresses inevitably occur in the outer layer with respect to the inner layer even with uniform percentage shrinkage of the bamboo. This is further reinforced by the internal structure of the bamboo which has more supporting cells in the outer third and more tubular water-transport cells and storage cells in the inner third.

A further difficulty influencing the stresses in the bamboo is posed by the internal transverse walls which are present at irregular intervals and are also manifested by a thickened bead surrounding on the outside of the bamboo.

Since, depending on the growth, the thickness of the wall compared with the diameter of the cane, the tonicity of the cane, the internal structure of the bamboo and its initial moisture content are also different for virtually each individual case, the types of influencing also have to be individually variable.

SUMMARY OF THE INVENTION

A method for crack prevention according to the present invention consists in opening the closed cross-section by means of at least one longitudinal cut along a circumferential line of the bamboo cane and thereby creating, so to speak, an artificial crack. However, despite the fact that the internal transverse walls have been previously bored through or even completely removed, this artificial crack does not very, that is to say open, remain the same or even close, uniformly in all cases during the drying operation. In the majority of cases, however, an opening of this longitudinal gap is to be found, so that after conclusion of the drying operation a strip, for example an adapted bamboo strip or a strip of a material of similar appearance, can be inserted into this longitudinal gap and be adhesively bonded or, instead of or in addition, be mechanically fastened by means of clips, bamboo dowels or the like. Adhesive bonding-in with the additional introduction of approximately 3 mm thick bamboo dowels In the longitudinal direction, in each case alternately obliquely through the adhesive surfaces of the bamboo strip at both sides, has proven to be particularly effective.

However, this mechanical treatment has to be assisted by selected, graded drying processes in order to obtain a bamboo product which does not crack even in European climatic conditions.

Pretreatment:

A further possibility of reducing the tendency of bamboo canes to crack consists in allowing the lower 50 to 200 cm of the grown bamboo cane to remain and only harvesting the upper region of the cane, since the initial moisture content of the bamboo cane decreases greatly with increasing height.

The fact that the branches and twigs of the bamboo are removed to the greatest possible extent some weeks before harvesting additionally reduces the water transport through the bamboo cane and thus the initial moisture content on harvesting.

As an auxiliary measure, the cut cane is stored still standing upright after harvesting, preferably still in the bamboo grove, during which the branches still present are left, by means of which a kind of predrying as a result of moisture emission via the leaves and evaporation via the cut surfaces, assisted by the lowering of the moisture in the bamboo cane as a result of gravity, takes place.

Active drying:

The active drying of the bamboo is carried out in several steps:

1st step

In the first step the bamboo is dried, preferably in the open air, from the initial moisture content (50 to 100%) down to the so-called fiber saturation limit. In the case of bamboo, this is between 14 and 21% by weight of water in contrast to wood, in which this value is 23 to 35%. Bamboo also begins to shrink even in this first drying phase in contrast to wood, which begins to shrink only after the moisture content falls below the fiber saturation value. Unless otherwise specified, all percentage figures are to be understood as percentages by weight.

This first phase is carried out by storage standing upright in half-shadow in the open air for 2 to 10 weeks, in particular from 3 to 4 weeks. During this, the moisture content is reduced to a value of approximately 17% within a band width of 13% to 25%. This value corresponds to the moisture equilibrium as is established with adequately long storage, as a result of the ambient air humidity in the tropics.

During this the bamboo shrinks in diameter by 4 to 14%, so that it is advantageous to remove the transverse walls even before this first drying phase. This may be carried out by striking or by means of an adjustable-diameter drill head.

This is necessary since, especially in this first drying phase, the free water is discharged from the plurality of water vessels located on the inner circumference and can escape outward more effectively when the transverse walls are removed.

If cracking occurs in this first step, this takes place principally from the inside, since the greatest shrinkage and stressing occurs as a result of evaporation of the free water in the capillaries of the regions of the cane close to the inner wall. However, cracking can be prevented to a large extent in this drying phase by means of the aforementioned measures.

Therefore, the introduction, described at the outset, of a longitudinal gap with a width of approximately 4 mm, by cutting open, sawing open or milling open, is carried out approximately on the 4th day of this 1st drying step and, if a chemical immersion-bath treatment is carried out at the start of the 1st drying step, 4 days after removal from the immersion bath.

During this 1st drying step, the variation of the gap width must be monitored, every 4 days at the latest, better daily, since the gap generally constricts. Before the gap closes owing to shrinkage of the bamboo, particularly in the interior region, and thus with diameter reduction, it has to be enlarged again by machining, to prevent mechanically-produced stresses when the cut surfaces bear against one another. If, after post-machining twice, the gap still reduces to 0 mm width, the bamboo cane is no longer suitable for further processing.

2nd step (drying chamber/climatic chamber)

In the second step, ideally, drying is carried out, starting exactly from the fiber saturation content of moisture, to 8% to 10% final moisture content. In this second drying phase, the bamboo preferably emits the water bound in the outer regions, as a result of which these outer layers try to contract, which, however, is impossible because of the inner layer which behaves differently. As a result—in a similar manner to a bimetal—the cane diameter is bent up, so that the circumference increases and a longitudinal gap is produced or is enlarged at one position on the cane circumference.

2.a, drying chamber

During the chamber drying, the air temperature is between 30° and 60° C. and the relative air humidity is 75% to 33% and the initial moisture content of the bamboo in this second phase must be no more than 24%.

Moreover, during the chamber drying the drying is regularly checked using a humidity measuring device, which is carried out every 2 hours during the second drying phase, every 2 days in the previous first phase in the open air.

Drying in the drying chamber is started with cold air and a high air humidity, the temperature being increased and the air humidity in the drying kiln being reduced in the course of the drying operation. Preferably drying is carried out in a plurality of chamber phases. For 3 m long bamboo canes with the conventional 5-year growth, removed from the central stem region, and with chemical pretreatment, the following values are typical:

1st step=30° Celsius/75% relative air humidity
2nd step=38° Celsius/60% relative air humidity
3rd step=49° Celsius/45% relative air humidity
4th step=60° Celsius/35% relative air humidity.

In the process, during the 1st phase, the outside, especially the knot region, of the bamboo cane is regularly sprayed with water to prevent any cracking specifically at that position. The total time for chamber drying (e.g. the 1st–4th phases described above) is 3–7 days, the total time and the details of the individual phases, depending on the wall thickness of the cane to be dried, differing approximately as follows:

| Wall thickness | 1st phase (x) | 2nd phase (x) | 3rd phase (x) | 4th phase (x) |
|---|---|---|---|---|
| 10 mm | 20 | 22 | 24 | 22 |
| 12 mm | 20 | 22 | 33 | 27 |
| 14 mm | 20 | 22 | 43 | 31 |
| 16 mm | 22 | 26 | 49 | 35 |
| 18 mm | 22 | 26 | 55 | 42 |
| 20 mm | 22 | 26 | 62 | 50 |

(x) = Residence time in hours

During the residence in the drying chamber, the width of the longitudinal gap is measured regularly, preferably approximately every 4 hours, manually or by means of strain gauges and its variation is monitored in order, despite the specified values for the individual phases, not to carry out the drying too rapidly, which inevitably leads to cracking.

Climatic chamber:

After approximately 3 to 7 days' residence time in the drying chamber, conditioning to the climatic conditions of the export country is carried out, that is to say acclimatization at approximately 40 to 50% air humidity and 20° to 25° C. temperature for European countries.

The residence time in the climatic chamber is 2 to 4 days, a diameter reduction of the bamboo cane of 5 to 12% again taking place with respect to the last phase in the drying chamber, on account of the higher relative air humidity in the climatic chamber with respect to the last phase in the drying chamber. This is deliberately introduced, since it has been found that this underdrying in the drying chamber increases the subsequent crack-resistance of the processed bamboo cane, since it subsequently has a reduced swelling tendency. This might be related to the permanent collapse of individual capillaries.

During the residence in the climatic chamber, the sealing, doweling and adhesive bonding of the bamboo strip inserted into the longitudinal gap is also carried out. For this purpose, work is frequently carried out on the bamboo canes during the day while at night they are stored in the climatic chamber again, for at least 15 hours in each case, for conditioning.

With a subsequent superficial abrasion of the outer surface of the bamboo cane, the adhesive joint of the bamboo strip is virtually invisible and, because of their different structure, only the bamboo dowels can be seen when viewed closely.

However, since, when the bamboo canes are used in construction, one side of the bamboo cane is usually poorly visible or completely invisible, the bamboo canes can be arranged with this seam side in the usually invisible region, whereas, in the case of bamboo canes dried without additional treatment, the cracking can take place at any position and therefore also usually in the visible region.

To facilitate the insertion of the sealing bamboo strip, bamboo strips of a prefabricated width and alignment of the adhesive surfaces are usually used, to which the gap in the bamboo cane is previously adapted by a corresponding milling operation, by means of which said gap is provided with the correct width and inclination of its adhesive surfaces.

Preferably the adhesive surfaces of the bamboo strip, and also of the longitudinal gap, taper conically obliquely from the inside outward, so that the longitudinal gap is wider on the inside than the outside and, after insertion of the bamboo strip, the adhesive joint is additionally wider on the inside than the outside.

However, it is also possible to mill out the longitudinal gap to a specific width and to form two parallel lateral surfaces, and to use bamboo strips prefabricated in exactly this manner.

This mode of operation is more time saving than determining the shape and size of the enlarged longitudinal gap formed by the drying individually in the case of each bamboo cane and transferring it accurately to a bamboo strip.

To further facilitate the insertion of the bamboo strip, the adhesive surface of the bamboo strip, and also of the bamboo cane, can advantageously be designed angled so as respectively to engage in one another, that is to say concavely in the case of the bamboo cane and convexly in the case of the bamboo strip or vice versa, so that, solely by the engagement of these profiles, a positive lock between the adhesive surfaces is produced which prefixes the bamboo strip until the adhesive sets.

Since the bamboo strip will generally have its external beads, produced by the transverse wall projection, at different distances than the bamboo cane, in the case where the bamboo cane has a plurality of transverse wall beads, not a single, continuous bamboo strip is used but rather parts in the longitudinal direction which each contain only one transverse wall bead which is placed at the same level as the transverse wall bead of the bamboo cane, so that the subsequent part of the bamboo strip is cut to length to fit this.

Instead of joining the inserted strip, on both sides, to the adjacent walls of the bamboo cane, this may also be carried out at only one side to leave a small, almost invisible joint, so that the bamboo cane can also work somewhat subsequently without stresses occurring. For this, the canes must subsequently be used in the construction such that the joint left is located at an invisible point.

Likewise, both the entire joint or else only the residual joint between the inserted strip and the original bamboo cane can be filled with a flexible filling composition such as polyurethane or silicone, in which case the filler, or at least the surface thereof, should be matched in color.

It is likewise possible to foam-fill the cane interior with a lightweight filler, such as a closed-cell foam, by means of which the specific weight is increased only slightly but, because of the complete-surface adhesion between the foam-filling and the cane inside, a contraction and also expansion of the cane in the processed state is made much more difficult. For foam-filling, preferably the first and last transverse walls, which were not removed by complete destruction but by sawing out, are firmly inserted again and serve as delimiting walls for the filling of the foam.

Another possibility consists in cutting open the bamboo cane before drying, not only at a circumferential line but rather at a plurality of circumferential lines, that is to say to perform a subdivision into two or more segments of the cross-section. In the case of subdivision into two segments, the half-shells thus produced generally bend to form shapes which correspond approximately to a half-ellipse.

These half-ellipses can either be adhesively bonded to one another again by interposed bamboo strips and thereby be complemented in cross-section to form approximately a circular profile, preferably only one bamboo strip being interposed, whereas at the opposite joint the two half-shells of the bamboo cane are adhesively bonded directly to one another.

Another possibility consists in adhesively bonding these half-shells directly to one another, with only limited bending up of the half-shells, in which case the adhesive surfaces should previously be aligned radially as accurately as possible with the center of the half-shell profile by milling or abrasion. This results in a uniformly narrow, almost invisible adhesive joint over the entire depth of the cane wall thickness, the resulting cane possessing an oval outer contour. By superficial abrasion, peeling or planing of the adhesively bonded cane circumference at these regions with the greatest diameter, that is to say in the region of the adhesive joints, it is partly possible to achieve an approximately round outer cane diameter without reducing the cane wall thickness in this region to the extent that the stability of the cane does not fall below the desired minimum stability.

In addition, the shrinkage of the bamboo cane can be influenced and minimized during drying by further measures.

For example, before drying and therefore usually even before the cutting open, the outer skin of the bamboo cane can be peeled off, since its shrinkage behavior in particular is very different from the remaining components of the bamboo cane, and after its removal the differences from the shrinkage behavior in the interior of the bamboo cross-section are very much lower.

Furthermore, after the complementing and adhesive bonding, the bamboo cane is abraded on the outside usually for visual reasons in order to equalize the different surface structure and surface color between the bamboo strip and bamboo cane.

Furthermore, a chemical pretreatment of the bamboo cane, preferably before the drying process, is advisable, it being necessary to differentiate between different objectives here:

On the one hand it may be attempted to replace the water present in the cells when the bamboo is in the raw state either partly or entirely by chemicals with low volatility, so that in the subsequent drying process a major proportion of these chemicals remains in the cells of the bamboo cane and the mechanical shrinkage is therefore very much lower.

Polyethylene glycol with molecular weights of 600, 1,000 or 1,500 and urea or sorbitol come into consideration for this, which are each used in aqueous solution.

Another possibility consists in replacing the water in the interior of the water cells by chemicals which are themselves highly hygroscopic and thus retaining the water which is naturally present in the bamboo or is introduced by the air humidity instead of allowing it to evaporate during drying. Borax, soda, boric acid and mixtures thereof, each as aqueous solution, come into consideration for this.

Irrespective of whether the bamboo is impregnated with such low-volatility chemicals or hygroscopic chemicals, which usually takes place in immersion baths and after removal of the transverse walls and after the cutting open, the bamboo should in any case be pretreated against insect attack by means of a 1 to 2% strength solution of boric acid in water, this solution being preferably adjusted to a pH of approximately 8 by the further addition of soda, thereby additionally reducing the risk of fungal attack. These substances may be already added in the case where low-volatility or hygroscopic chemicals are used, so that only a single immersion bath is necessary, in which the bamboo usually remains for several, for example five, days and in the process preferably at a bath temperature of approximately 45° C. and at ambient pressure, since this still provides an adequate result with the least outlay. The increase in the pressure in the immersion bath reduces the residence time.

Influencing the drying process itself represents a further possibility of reducing, or even avoiding, the non-uniform shrinkage of the bamboo cane. This reduces the gap formation in the above-described, cut-open bamboo canes, and in the extreme case can function so precisely that cutting open of the bamboo cane along the circumferential surface is no longer necessary at all.

On the other hand, the drilling through or, better, complete removal of the internal transverse walls of the bamboo is always necessary.

The drying operation should preferably already be influenced by the fact that only bamboo canes are used which are at least five years old, have grown on relatively barren ground and have been harvested, as far as possible, in the dry season. In the case of these bamboo canes, the cell wall proportion with respect to the stored water proportion is already higher and the shrinkage difference between the interior cells with large internal empty spaces and the exterior cell structures with low storage capacities is therefore less great.

If cutting open of the bamboo canes is nevertheless used, then it is advisable, before cutting open, to dry the bamboo canes by slow air drying, without direct sunlight, from the originally approximately 50 to 100% moisture content to approximately 17% moisture content, the fiber saturation degree, since by this means not only is the cutting operation itself easier to accomplish but, in particular, a part of the shrinkage within the bamboo cane has already taken place and although, during further drying to the desired 8 to 10% residual humidity, an increase in the gap produced will occur as a result of said shrinkage, it will occur with a relatively uniform shape along the length of the gap, so that severe deformation of the gap, which is disadvantageous for subsequent neat sealing, is avoided.

Furthermore, the selectively different drying of the bamboo cane in the interior thereof with respect to the outer surface is advantageous. After the drilling through and removal of the transverse walls, with a closed cane cross-section, the interior space can be dried selectively more intensively than the outer surfaces by means of dry hot air conducted through, as a result of which the different shrinkage rate between the internal regions and external regions, which is otherwise present, can be reduced or even entirely compensated for.

Since these differences are individually different for each cane, a precise control of this internal drying can only be carried out optimally using additional sensor technology, by providing sensors, in each case on the interior wall of the cane and on the exterior wall, for permanent stress measurement and/or moisture-content measurement during the drying operation and, by this means, by controlling selectively the temperature difference and humidity difference of the air outside the bamboo cane with respect to the air within the bamboo cane, and also, if appropriate, controlling its flow rate in dependence on the measurement results.

The combined use of this internal drying with cutting open of the bamboo cane along a circumferential surface would also be possible by sealing this Sap for the internal drying operation by means of a rubber bead, etc. bearing against the gap externally or internally, and by controlling the aforementioned factors governing the internal drying not as a function of the stress measurement in the bamboo cane but as a function of the measurable variation of the gap width.

By this means, in the optimum case, the drying operation can be carried out such that, at the end of the drying operation, the gap has closed completely or at least to the extent that the insertion of a bamboo strip is no longer necessary, but only the adhesive bonding of the gap is sufficient. This significantly reduces the work outlay.

In principle, instead of cutting open the bamboo cane, another kind of mechanical stress relief can also be used here, for example the introduction of a multiplicity of bores along a circumferential line of the bamboo cane, which are sealed again with corresponding plugs of bamboo wood after completion of the drying operation.

Since the problem of exterior wall curvature and the occurring transverse wall outer beads does not arise in the production and insertion of such plugs, this sealing operation can be carried out more rapidly than the insertion of a multi-part bamboo strip.

BRIEF DESCRIPTION OF THE DRAWINGS

An embodiment according to the invention is explained in greater detail by way of example with reference to the figures, in which.

DETAILED DESCRIPTION OF THE PREFERRED EMBODIMENT

Figure 1:
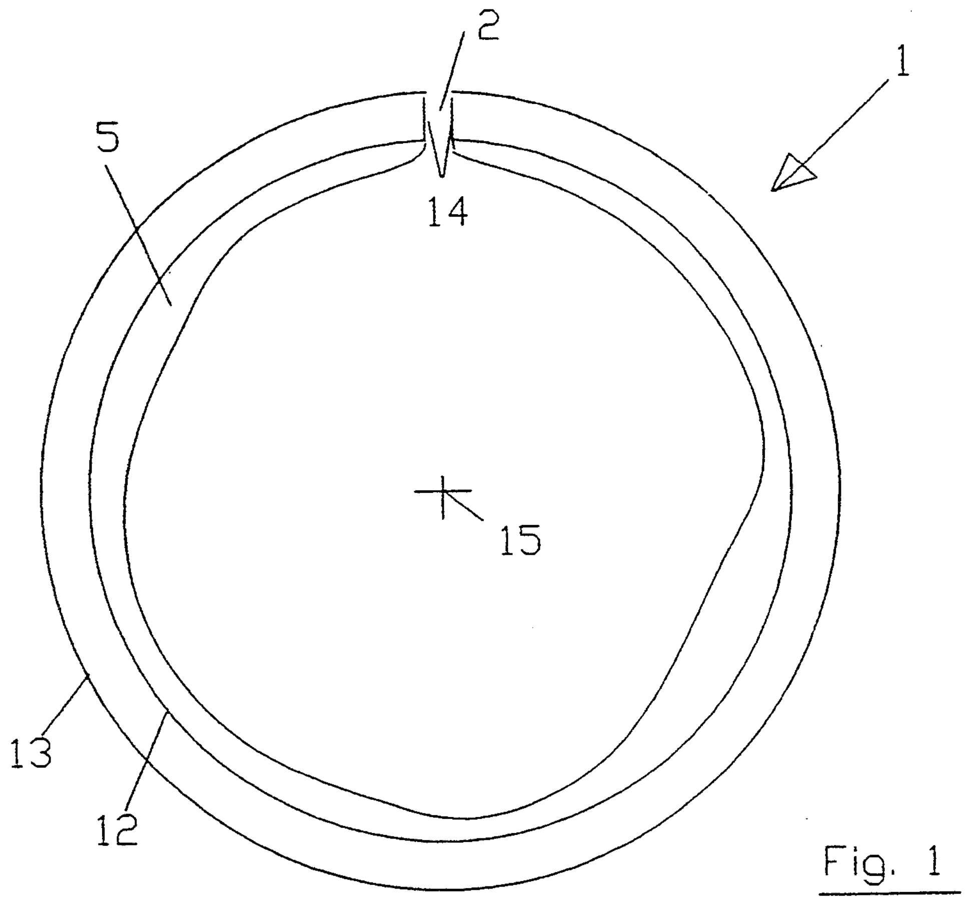
FIG. 1 shows a cut-open bamboo cross-section before drying.

FIG. 1 shows a bamboo cane 1 in cross-section, in which the transverse wall 5 has been removed to the greatest possible extent and the bamboo cane 1 has been cut open along a circumferential line, resulting in a longitudinal gap 2.

In this case, as a result of the cutting operation, which has been carried out with a circular saw or the like, the side walls of the longitudinal gap 2 are parallel to each other and extend essentially radially.

Figure 2:
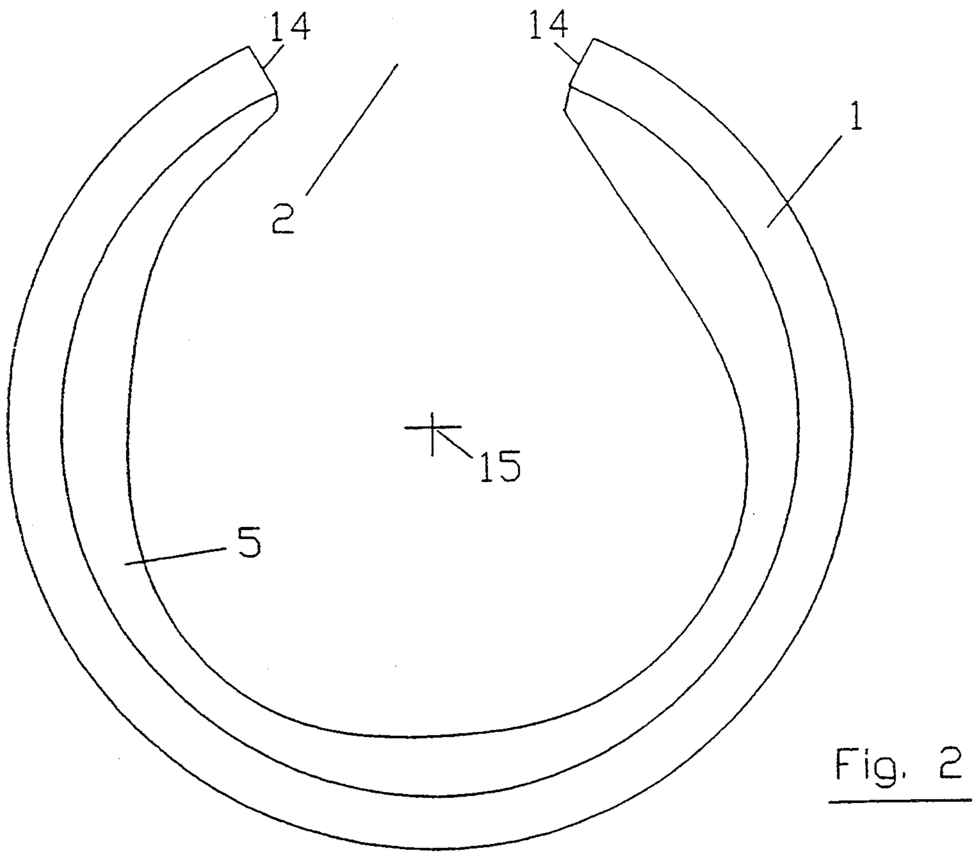
FIG. 2 shows a bamboo cross-section after drying.

FIG. 2 shows the bamboo cane according to FIG. 1 after the drying process, as a result of which the bamboo cane 1 has contracted somewhat along its circumference and consequently the longitudinal gap 2 has become significantly wider. In this process, in some circumstances the external diameter of the bamboo cane 1 can even become somewhat larger with respect to the condition before drying.

The side walls 14 of the longitudinal gap 2 in this case are still essentially radial with respect to the longitudinal axis 15 of the bamboo cane.

As is shown by the uniformly circular outer circumference of the canes, at least before drying, according to FIG. 1, the outer skin 13 of the bamboo cane has been peeled to obtain a more uniform appearance on the one hand and on the other hand to reduce the high shrinkage difference which is otherwise present between the natural outer skin 13 and inner skin 12 of the bamboo cane.

Figure 3:
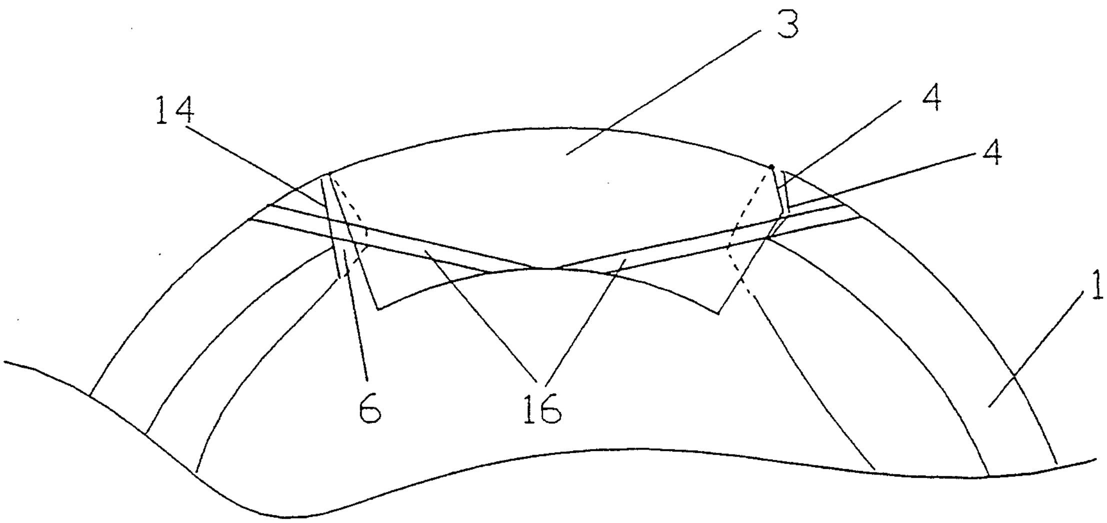
FIG. 3 shows a detailed view of the gap produced with inserted bamboo strip.

FIG. 3 shows a detailed view of the bamboo filler strip 3 inserted into the enlarged longitudinal gap 2.

It can be seen here that not only has the longitudinal gap 2 been enlarged but its side walls 14 have also been changed as regards their angular setting by the milling, by means of which the enlargement is generally carried out. As can be seen in the left-hand half of FIG. 3, the side wall 14 of the bamboo cane 1 no longer extends radially but is arranged obliquely from the inside outward so as to taper the longitudinal gap 2. The opposite adhesive surface 4 of the bamboo cane 1 is also arranged obliquely in this direction, but with a lower inclination so that an adhesive joint 6 is produced which is wider on the inside than on the outside and is thus virtually invisible on the outside.

In the right-hand half of FIG. 3, the adhesive surface 4 of the bamboo filler strip 3 and also the adhesive surface 4' of the bamboo cane 1 are in each case designed adapted in an angular manner to one another, the adhesive surface 4' of the bamboo cane 1 being concave in shape and representing a recess, which is angular in cross-section, in the side wall 14 of the bamboo cane 1. A correspondingly convex countercontour of the bamboo strip 3 engages in this angled groove and is there held positively by the stress of the bamboo cane 1 until the adhesive sets.

In FIG. 3, dowels 16 can furthermore be seen on both sides which are introduced in alternation, offset in the longitudinal direction of the bamboo strip 3. The dowels 16 in this case extend from the surface of the bamboo cane at a distance of approximately 5 to 15 mm but adjacent to the side walls 14, obliquely inwards transversely beyond the adhesive joint 6 and reach the inside of the bamboo strip 3, approximately in the center thereof.

The dowels themselves consist of bamboo wood and have a diameter of approximately 3 to 5 mm.

Figure 4:
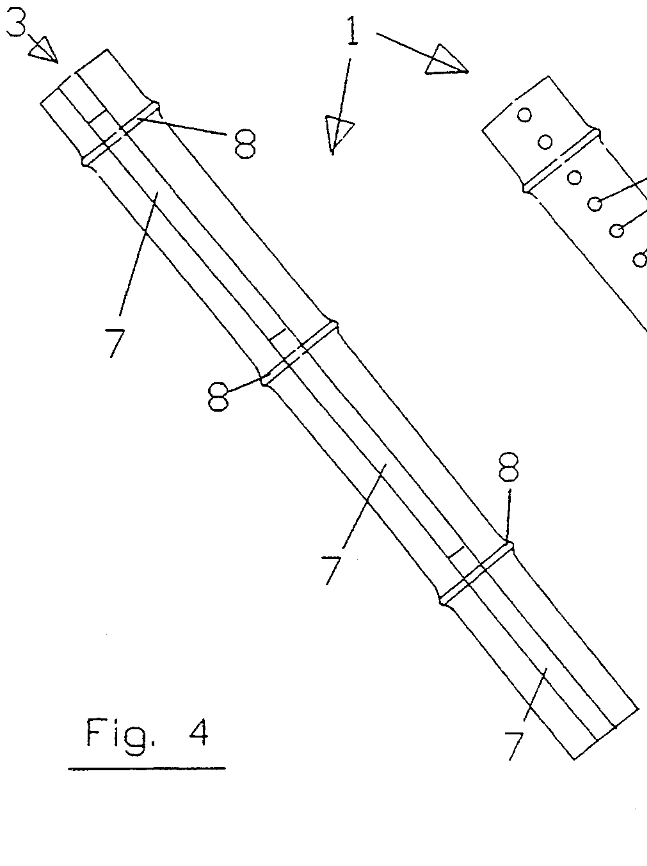
FIG. 4 shows a longitudinal view of a finished processed bamboo cane.
Figure 5:
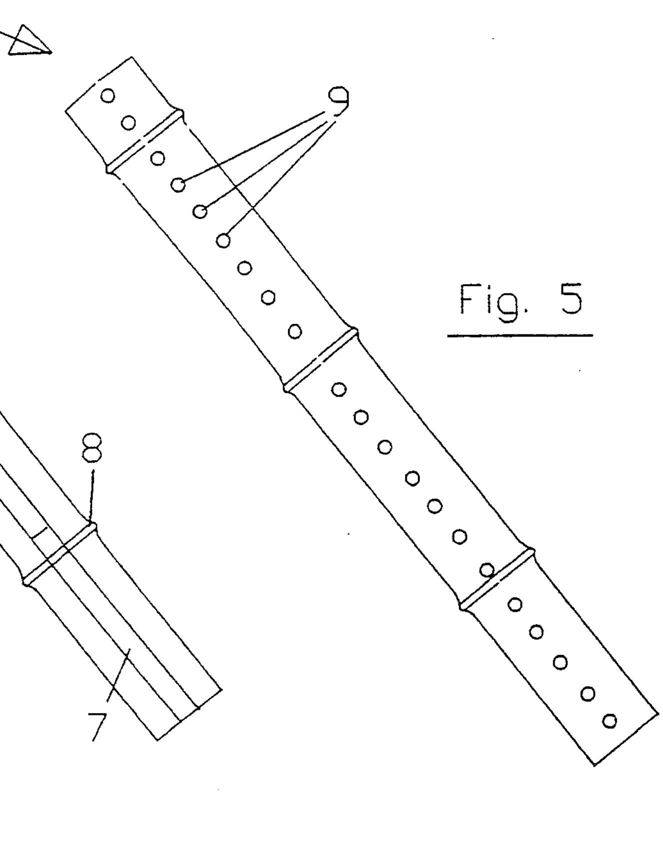
FIG. 5 shows a longitudinal view of a bamboo cane processed with bores.

FIGS. 4 and 5 each show a perspective view of an entire bamboo cane with a plurality of transverse wall projections 8.

FIG. 4 shows a finished bamboo cane 1 with a bamboo strip 3 which consists of a plurality of parts 7 and is inserted in the longitudinal gap 2, the adhesive joints, although being visible in the diagrammatic view, being virtually invisible in practice after abrasion of the surface.

FIG. 5 shows the described solution of equipping a bamboo cane 1 with a multiplicity of bores 9 along one of its circumferential lines, which bores 9 can also compensate for stresses during drying and, after conclusion of the drying, are sealed by corresponding plugs consisting of bamboo, in which naturally care is taken that the fiber direction is the same as the surrounding bamboo material. The interspace between the bores should in this case be approximately twice as large as the diameter of the bores.

As regards the arrangement and shape of the side walls of the bores 9, that stated for the bamboo strips 3 applies analogously, it being possible, however, to dispense with additional mechanical fixing with dowels, clips, nails or screws.

I claim:

1. A method for crack prevention in a bamboo cane, comprising the steps of:

cutting the cane longitudinally along its entire length to produce a longitudinal gap in the cane;

drying the cut cane to a desired degree of moisture content; and, sealing the longitudinal gap by adhesively bonding a strip of material onto the cane along the entire length of the gap.

2. The method as in claim 1, wherein the strip of material is inserted into the gap.

3. The method as claimed in claim 1, wherein the material strip is fitted to the gap and is attached to a cut surface of the cane on only one side.

4. The method as claimed in claim 2 including, after drying and before the bonding of the strip, milling out the gap for dimensioning and shaping.

5. The method as claimed in claim 1, including, in addition to adhesive bonding, mechanically joining the strip to the cane, transverse to a surface to which the strip is adhesively bonded.

6. The method as claimed in claim 1, including removing transverse walls within the cane before drying.

7. The method as claimed in claim 1, including bevelling surfaces of the strip and of the cane such that they are slightly wedge-shaped.

8. The method as claimed in claim 1, including chemically pretreating the cane before drying.

9. The method as claimed in claim 1, including forming the strip so as to have a plurality of parts in its longitudinal direction, each part of the strip having at most one transverse wall projection.

10. The method as claimed in claim 1, including selecting a bamboo cane having a growth age of at least four years.

11. The method as claimed in claim 6, wherein, after removing the transverse walls and before being cut open, the cane is pretreated with a 1 to 2% strength aqueous solution of boric acid which has been adjusted to a pH of 8 by the further addition of soda.

12. The method as claimed in claim 1, including providing the cane with a longitudinal groove to define a predetermined breaking point.

13. The method as claimed in claim 12, wherein the longitudinal groove is formed on the interior of the cane.

14. The method as claimed in claim 1, including filling the interior of the cane with a lightweight hardening foam.

15. The method as claimed in claim 1, wherein, in a first drying step, the cane is dried standing vertically in the open air for several weeks down to the fiber saturation limit, and in a second drying step, the cane is first dried in a drying chamber for several days, at a temperature increasing to 60° Celsius and at an air humidity decreasing to 35% relative air humidity, to below the moisture-content value which would be established as an equilibrium in the cane at the subsequent place of installation, wherein subsequent conditioning is carried out for several days at the temperature and air humidity of the place of installation.

16. The method as claimed in claim 15, wherein the sealing of the cane and processing the cane to form the final product takes place during the conditioning phase and, in the conditioning phase, the cane is conditioned for at least 12 hours per day.

17. The method as claimed in claim 1, wherein, during the drying step, the longitudinal gap is monitored with respect to its width change and, in the event that it constricts towards zero width, mechanical widening is carried out by cutting, sawing or milling, and, in the event that subsequent enlargement by 4 mm in each case is carried out twice, the cane is separated out of the process.

* * * * *